(12) United States Patent
Cina et al.

(10) Patent No.: US 10,641,701 B2
(45) Date of Patent: May 5, 2020

(54) DISTRIBUTED DEVICE FOR THE DETECTION OF A SUBSTANCE

(71) Applicant: Commissariat à l'Energie Atomique et aux Energies Alternatives, Paris (FR)

(72) Inventors: Salvatore Cina, Coublevie (FR); Bruno Mourey, Coublevie (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 0 days.

(21) Appl. No.: 16/072,584

(22) PCT Filed: Jan. 24, 2017

(86) PCT No.: PCT/FR2017/050151
§ 371 (c)(1),
(2) Date: Jul. 25, 2018

(87) PCT Pub. No.: WO2017/129893
PCT Pub. Date: Aug. 3, 2017

(65) Prior Publication Data
US 2019/0033202 A1 Jan. 31, 2019

(30) Foreign Application Priority Data

Jan. 26, 2016 (FR) .................................. 16 50602

(51) Int. Cl.
*G01N 21/17* (2006.01)
*G02B 6/02* (2006.01)
(Continued)

(52) U.S. Cl.
CPC ....... *G01N 21/1702* (2013.01); *E21B 47/102* (2013.01); *G01N 21/274* (2013.01);
(Continued)

(58) Field of Classification Search
CPC ............. G01N 21/1702; G01N 21/274; G01N 21/9009; G01N 2021/1704;
(Continued)

(56) References Cited

U.S. PATENT DOCUMENTS 5,226,730 A * 7/1993 Berthold ................ G01K 11/24
374/117
5,315,673 A * 5/1994 Stetter ................ G01N 21/7703
385/12
(Continued)

FOREIGN PATENT DOCUMENTS

GB        2522266 A    7/2015

OTHER PUBLICATIONS

Cao et al., "Evanescent-wave photoacoustic spectroscopy with optical micro/nano fibers," Optics Letter, vol. 37, No. 2, Jan. 15, 2012, pp. 214-216.
(Continued)

*Primary Examiner* — Sang H Nguyen
(74) *Attorney, Agent, or Firm* — Moreno IP Law LLC

(57) ABSTRACT

A distributed device for the detection of a substance is disclosed, comprising: a distributed optical excitation source (21) including a first optical fiber (22) having a plurality of extraction regions (24), each extraction region (24) being adapted to extract part of the light carried by the first optical fiber (22) from said fiber; and a distributed acoustic sensor (25) including a second optical fiber (26).

14 Claims, 3 Drawing Sheets

(51) Int. Cl.
*G01N 21/90* (2006.01)
*G01N 21/27* (2006.01)
*E21B 47/10* (2012.01)

(52) U.S. Cl.
CPC ....... *G01N 21/9009* (2013.01); *G02B 6/0208* (2013.01); *G01N 2021/1704* (2013.01); *G01N 2021/1793* (2013.01); *G01N 2201/0846* (2013.01)

(58) Field of Classification Search
CPC ... G01N 2021/1793; G01N 2201/0846; G02B 6/02076; G02B 6/0208; E21B 47/102
See application file for complete search history.

(56) References Cited

U.S. PATENT DOCUMENTS

| | | | | |
|---|---|---|---|---|
| 5,436,655 | A * | 7/1995 | Hiyama | A61B 1/00193 348/139 |
| 5,696,863 | A * | 12/1997 | Kleinerman | F25B 23/003 250/227.11 |
| 5,784,098 | A * | 7/1998 | Shoji | G01B 11/25 348/139 |
| 6,281,489 | B1 * | 8/2001 | Tubel | E21B 47/00 166/250.15 |
| 6,535,667 | B1 | 3/2003 | Gozum et al. | |
| 7,952,772 | B2 * | 5/2011 | Sanders | G01N 21/7746 250/227.18 |
| 2003/0164952 | A1 * | 9/2003 | Deichmann | A61B 1/05 356/603 |
| 2004/0247271 | A1 * | 12/2004 | Skovgaard | G02B 6/02357 385/125 |
| 2007/0223556 | A1 * | 9/2007 | Lee | G01K 11/32 374/1 |
| 2008/0084914 | A1 * | 4/2008 | Yamamoto | G01B 11/18 374/137 |
| 2009/0201953 | A1 * | 8/2009 | Peyghambarian | C03B 37/0122 372/6 |
| 2011/0019179 | A1 * | 1/2011 | Molin | G01D 5/35303 356/32 |
| 2011/0026031 | A1 | 2/2011 | Kristiansen et al. | |
| 2012/0274927 | A1 * | 11/2012 | Li | G01K 11/32 356/73.1 |
| 2013/0216176 | A1 * | 8/2013 | Li | G01K 11/32 385/12 |
| 2013/0301037 | A1 * | 11/2013 | Handerek | G01D 5/353 356/73.1 |
| 2014/0042306 | A1 * | 2/2014 | Hoover | G01J 5/0821 250/227.14 |
| 2014/0071257 | A1 * | 3/2014 | Yokota | A61B 1/00096 348/68 |
| 2014/0180070 | A1 | 6/2014 | Millett et al. | |
| 2016/0084640 | A1 * | 3/2016 | Hunt | G01L 1/246 356/34 |
| 2017/0176221 | A1 * | 6/2017 | Hartog | G01D 5/35364 |

OTHER PUBLICATIONS ofs, "Oil and Gas Distributed Acoustic Sensing (DAS)," retrieved from the Internet <URL:http://web.archive.org/web/28158324234246/http://www.ofsoptics.com/oil-gas-distributed-acoustic-sensing.html>, accessed Sep. 16, 2016, 2 pages.
International Search Report for International Application No. PCT/FR2017/050151 dated Apr. 26, 2017, 3 pages.
Written Opinion of the International Search Authority for International Application No. PCT/FR2017/050151 dated Apr. 26, 2017, 7 pages.

* cited by examiner

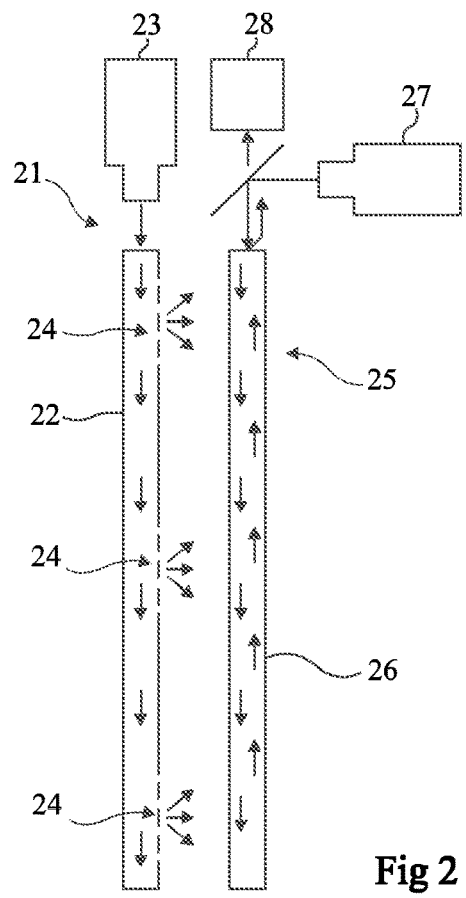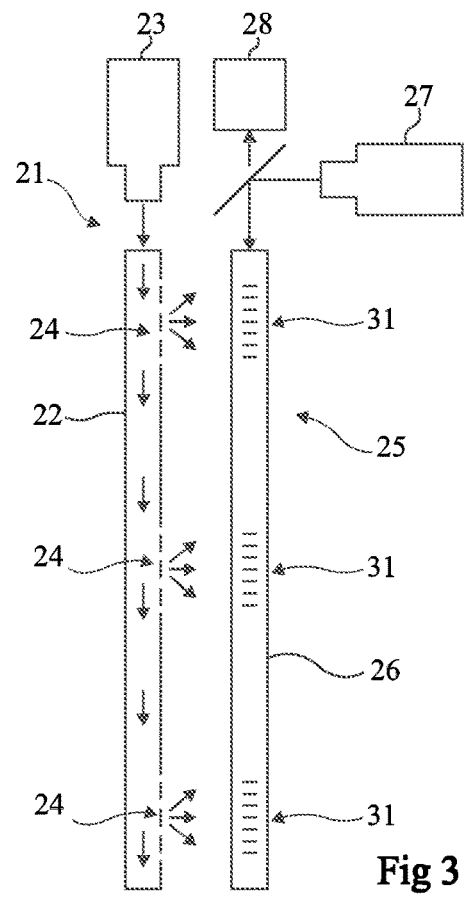
Fig 2
Fig 3
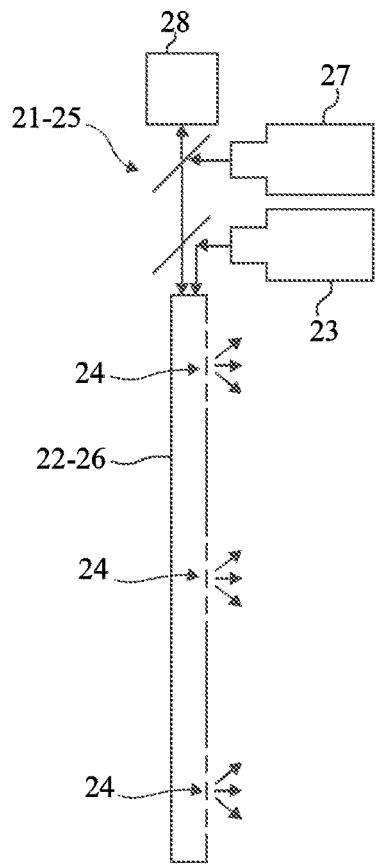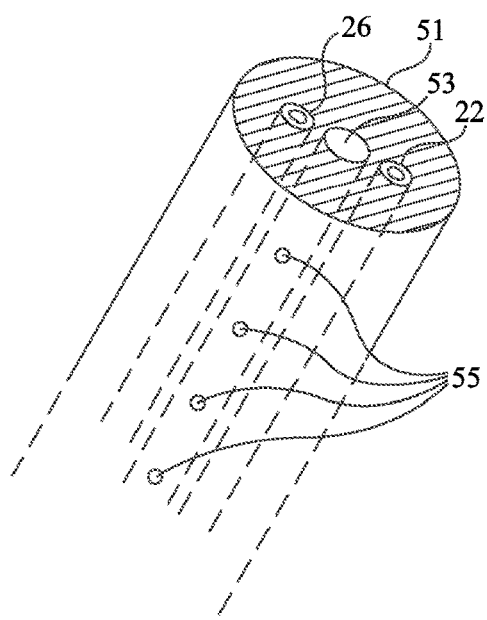
Fig 4
Fig 5

DISTRIBUTED DEVICE FOR THE DETECTION OF A SUBSTANCE

CROSS-REFERENCE TO RELATED APPLICATION

The present patent application claims the priority benefit of French patent application FR16/50602 which is herein incorporated by reference.

FIELD

The present disclosure concerns a distributed device enabling to detect the presence of a substance in an extensive area. It for example aims at a distributed device capable of detecting certain corrosive substances such as carbon dioxide ($CO_2$) or hydrogen sulfide ($H_2S$) in oil drilling plants. It also aims at a distributed device capable of detecting hydrocarbon leaks in buried oil pipelines. It is however not limited to these specific fields of application.

BACKGROUND

FIG. 1 very schematically shows an example of an oil drilling plant in a marine environment. This plant comprises a floating platform 1 located at the sea surface, vertically above a well 3 drilled from the sea bottom and emerging into the oil reserve to be extracted (not shown). An immersed pumping system 5 lies on the sea bottom at the level of the opening of well 3. Pumping system 5 is capable of extracting the oil from well 3. The plant further comprises a pipe 7 extending between pumping system 5 and platform 1, intended to convey to platform 1 the oil extracted from well 3. Pipe 7 is itself arranged in a protection tube 9 also extending between pumping system 5 and platform 1. The space between the inner wall of tube 9 and the outer wall of pipe 7 may contain cables 11 coupling pumping system 5 to platform 1, for example, electric cables for powering pumping system 5.

During the extraction, a mixture of water, of mud, of oil, etc. may rise from well 3, inside of the space located between oil pipe 7 and protection tube 9. The mixture may contain corrosive substances such as carbon dioxide ($CO_2$) or hydrogen sulfide ($H_2S$). Such substances are capable of degrading cables 11 coupling pumping system 5 to platform 1. The presence of such substances is difficult to anticipate since the latter generally come from the inside of the oil reserve, and it is not known in advance whether the reserve contains such substances and by which quantities.

There thus is a need for a device enabling to detect in situ the presence of one or of a plurality of corrosive substances inside of tube 9, for example, to be able to interrupt the extraction and replace cables 11 when an excessive concentration of such a substance is detected. It should be noted that the substances which are desired to be detected are generally in gaseous form in the pressure and temperature conditions usually encountered at the sea surface, but may be in liquid form in the pressure and temperature conditions encountered in the lower portion of tube 9.

The document entitled "Distributed Fiber Optic Gas Sensing for Harsh Environment" of Juntao Wu (www.osti.gov/scitech/servlets/purl/938805) describes a distributed gas detection device comprising an optical fiber having a portion of its sheath modified to react with the gas to be detected. The gas concentration is indirectly measured by the modification of the optical properties of the fiber. A disadvantage of this device is that the modifications of the optical properties of the fiber is irreversible, which implies that the measurement can only be performed once. Further, with such a method, it is difficult to measure the concentration of a plurality of different substances by means of a same fiber.

The document entitled "Gas detection with micro- and nano-engineered optical fibers" of W. Jin et al. (Optical Fiber Technology, Volume 19, Issue 6, Part B, December 2013, Pages 741-759), describes various technical solutions for the detection of gas. Most solutions are non-distributed, and do not enable to monitor extensive areas. The distributed solutions described in this article (section 4 of the article) are based on the direct spectroscopic analysis of a light beam interacting with the monitored gas. Such solutions require using optical fibers having complex structures, to enable part of the light propagating through the fiber to interact with the gas, and then to reintegrate the fiber, so that a reflected or back-scattered signal can be analyzed at the fiber input. More particularly, the distributed solutions described by W. Jin et al. use either optical fibers of HC-PBGF type ("Hollow-core photonic bandgap fibers"), that is, fibers having a discontinuous core, the gas to be analyzed being placed on the path of light between the successive sections of the core, or optical fibers of SCF type ("Suspended Core Fiber"), that is, fibers having a core suspended in a cavity filled with the gas to be analyzed. W. Jin et al.'s article further mentions solutions based on the principles of photo-acoustic detection. The article however does not detail a distributed photo-acoustic solution, enabling to monitor extensive areas.

SUMMARY

Thus, an embodiment provides a distributed substance detection device, comprising: a distributed optical excitation source including a first optical fiber provided with a plurality of extraction regions, each extraction region being capable of extracting from the first optical fiber part of the light conveyed by the fiber; and a distributed acoustic detector comprising a second optical fiber.

According to an embodiment, the distributed optical excitation source comprises a first light source capable of injecting into the first optical fiber a light signal at a predetermined absorption wavelength of the substance to be detected.

According to an embodiment, the detection device comprises a control circuit capable of modulating said light signal in intensity at a predetermined acoustic frequency.

According to an embodiment, the first light source is adjustable in terms of wavelength.

According to an embodiment, the distributed acoustic detector comprises a second light source capable of injecting a light signal into the second optical fiber, and an optical detector capable of measuring a backscattered light signal in the second optical fiber.

According to an embodiment, the second optical fiber comprises a plurality of measurement regions each comprising a Bragg mirror placed on the path of the light conveyed by the second optical fiber.

According to an embodiment, the first and second optical fibers are confounded.

According to an embodiment, the first and second optical fibers are arranged in a support, the support defining a tubular cavity extending along substantially the entire length of the first and second optical fibers, said cavity being capable of confining a sample of a fluid where the possible presence of said substance is desired to be detected.

According to an embodiment, the cavity is coupled to an outer environment by a plurality of openings formed in the support.

According to an embodiment, the first optical fiber is located in said cavity.

According to an embodiment, the cavity comprises a plurality of nip or throat areas distributed all along its length.

According to an embodiment, the substance to be detected is carbon dioxide ($CO_2$) or hydrogen sulfide ($H_2S$).

BRIEF DESCRIPTION OF THE DRAWINGS

The foregoing and other features and advantages will be discussed in detail in the following non-limiting description of specific embodiments in connection with the accompanying drawings, among which:

FIG. 2 is a partial simplified cross-section view of an embodiment of a distributed substance detection device;

FIG. 3 is a simplified cross-section view of an alternative embodiment of the device of FIG. 2;

FIG. 4 is a simplified cross-section view of another alternative embodiment of the device of FIG. 2;

FIG. 5 is a partial simplified perspective view of an example of layout of the optical fibers of a device of the type described in relation with FIGS. 2, 3, and 4.

DETAILED DESCRIPTION OF THE PRESENT EMBODIMENTS

Figure 1:
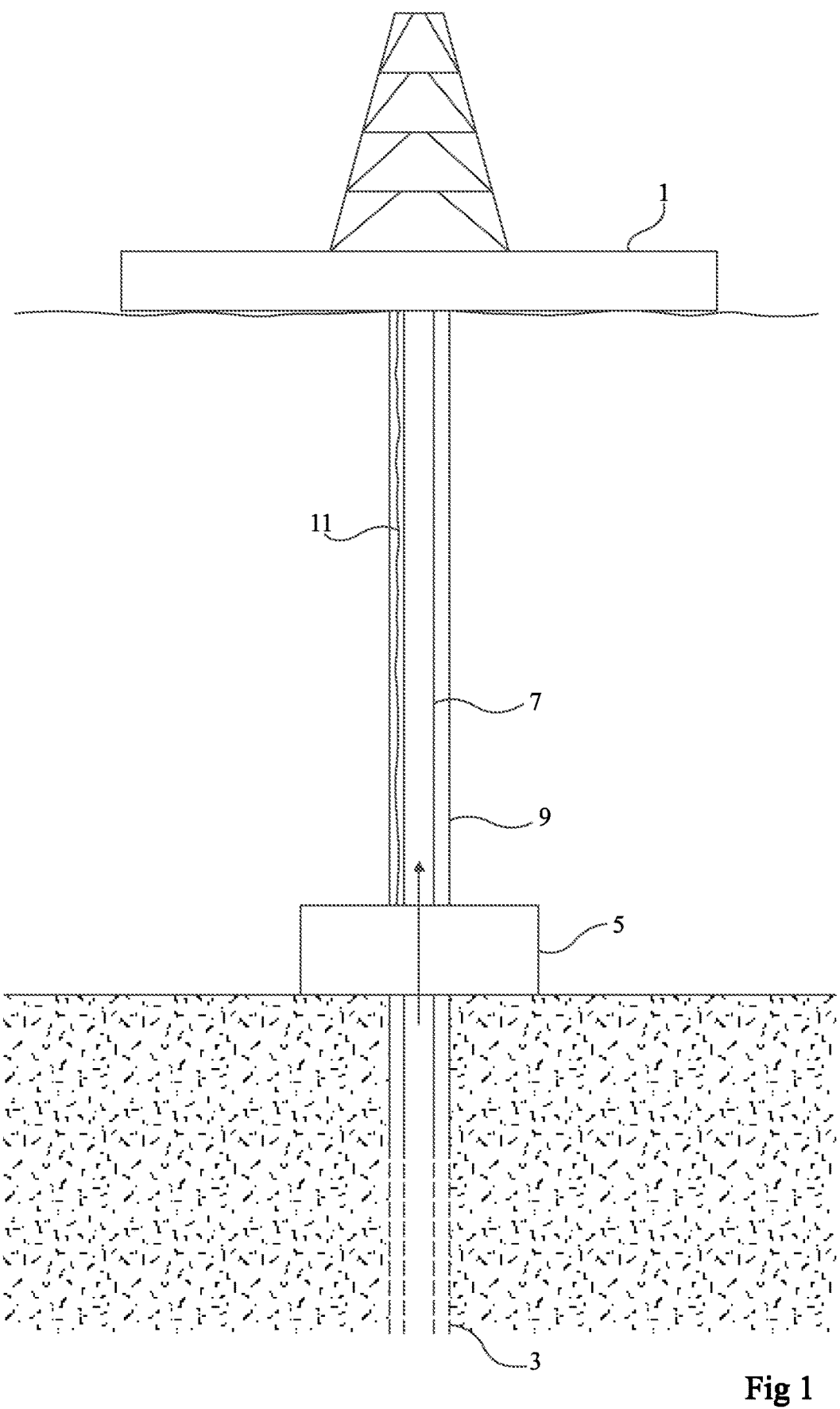
FIG. 1, previously described, schematically illustrates an example of an oil drilling plant.

The same elements have been designated with the same reference numerals in the different drawings and, further, the various drawings are not to scale. For clarity, only those elements which are useful to the understanding of the described embodiments have been shown and are detailed. The terms "approximately", "substantially", and "in the order of" are used herein to designate a tolerance of plus or minus 10%, preferably of plus or minus 5%, of the value in question.

FIG. 2 is a partial simplified cross-section view of an embodiment of a distributed substance detection device.

The device of FIG. 2 comprises a distributed optical excitation source 21. Distributed source 21 comprises an optical fiber 22, and a light source 23, for example, a laser source, coupled to a proximal end of optical fiber 22 to be able to inject light into fiber 22. Optical fiber 22 comprises a plurality of extraction regions 24, for example, regularly distributed along the entire length of the fiber. Each extraction region 24 is capable of extracting from fiber 22 part of the light conveyed by the fiber. As an example, fiber 22 comprises a core (not detailed in the drawing) made of a transparent material having a first refraction index, a sheath (not detailed in the drawing) made of a transparent material having a second refraction index coating the core, and a protective coating (not detailed in the drawing) surrounding the sheath. The core, the sheath, and the protective coating are for example made of solid materials in normal conditions of use of the fiber. The sheath is for example in contact with the core all along its periphery and all along the fiber length. Fiber 22 is for example continuous, that is, its core is uninterrupted all along the fiber length. Each extraction region 24 for example corresponds to a portion of fiber 22 comprising microstructures, for example, formed on the sheath of the fiber, causing the extraction to the outside of the fiber of part of the light conveyed by the fiber. Such microstructures are for example disordered microstructures resulting in diffusing in all directions part of the light conveyed by the fiber, or ordered microstructures defining a diffraction grating capable of deviating according to a determined angle part of the light conveyed by the fiber. In the case where the protective coating of the fiber is opaque, the latter may be removed at the level of extraction regions 24. If the protective material of the fiber is transparent for the wavelength emitted by the source, the latter may be kept at the level of extraction regions 24. Extraction regions 24 are for example sized so that, for a given power of emission of light source 23, the light flow emitted outside of fiber 22 at the level of each of extraction regions 24 has substantially the same intensity.

The device of FIG. 2 further comprises a distributed acoustic detector 25. Acoustic detector 25 comprises an optical fiber 26 and a light source 27, for example, a laser source, coupled to a proximal end of optical fiber 26 to be able to inject light into fiber 26. Distributed acoustic detector 25 further comprises an optical detector 28 coupled to the proximal end of optical fiber 26. Distributed acoustic detector 25 operates as follows. Light source 27 emits light pulses in fiber 26 via its proximal end. When light propagates along fiber 26 towards its distal end, the light interacts at the molecular level with the material forming the core of the fiber. As a result, part of the light is backscattered and sent back to the proximal end of the fiber. The backscattered light is detected and analyzed by optical detector 28. When acoustic vibrations interact with the materials of optical fiber 26, the latter are submitted to slight changes of refraction index. Such changes affect the characteristics of the backscattered light, which enables to measure and to locate (by time-of-flight measurements) the acoustic vibrations. Distributed acoustic detector 25 will not be further detailed hereafter, the described embodiments being compatible with most known distributed acoustic detectors with optical fibers. Examples of such detectors are for example described in patent application WO2015/094180. Such detectors are further available for sale, for example, the detectors sold by OF S (http://www.ofsoptics.com/oil-gas-distributed-acoustic-sensing.html) and SILIXA (http://silixa.com/technology/idas/).

The distributed substance detection device of FIG. 2 operates as follows.

The optical fibers 22 of distributed light excitation source 21 and 26 of distributed acoustic detector 25 are both placed in the area which is desired to be monitored, for example, in the space between oil extraction pipe 7 and protection tube 9 in the plant of FIG. 1. Optical fiber 22 is arranged so that the light flow emitted by extraction regions 24 illuminates the medium to be monitored, that is, the medium likely to contain the substance to be detected. The length of optical fiber 22 is for example substantially identical to the length of optical fiber 26, for example, in the range from 50 m to 50 km. Optical fibers 22 and 26 are for example assembled so that the distance between fiber 22 and fiber 26 is substantially constant along the entire length of the fibers.

Once optical fibers 22 and 26 are in place, light source 23 is controlled by a control circuit (not shown in the drawings) to inject into optical fiber 22 a light flow at an absorption wavelength or resonance wavelength of the substance which is desired to be detected. Thus, at the level of each of the extraction regions 24 of optical fiber 22, the monitored medium is illuminated at an absorption wavelength of the substance to be detected. The light intensity emitted by source 23 is modulated at an acoustic frequency, for example, a frequency in the range from 1 Hz to 50 kHz. The device of FIG. 2 operates according to the principle of photo-acoustic detection. When the substance which is desired to be detected is present at the level of one of the extraction regions 24 of optical fiber 22 and is illuminated by the output light flow of fiber 22, the absorption of light by this substance translates as the emission of an acoustic wave at the modulation frequency of light source 23. The acoustic wave is detected and located by distributed acoustic device 25, which enables to detect and to locate the desired substance. To guarantee the proper operation of the device, it will be ascertained that the modulation frequency of light source 23 is in the range of acoustic frequencies detectable by acoustic detection device 25. Further, such a frequency will be preferably selected to be remote from the acoustic frequencies currently present in the considered environment, which might disturb the measurement. The number and the distribution of light extraction regions 24 along optical fiber 22 may be freely selected according to the desired detection resolution. Light source 23 is for example selected to be adjustable in terms of wavelength, to be able to successively detect a plurality of different substances having different absorption wavelengths, or to be able to detect a single substance with limited risks of false detection, by repeating a plurality of times the measurement at a plurality of different optical excitation wavelengths. As an example, light source 23 has a wavelength adjustable between 1 and 10 µm. Source 23 for example comprises one or a plurality of lasers.

An advantage of the device of FIG. 2 is that it enables to detect the presence of one or of a plurality of gas or liquid substances over very large distances, typically from several tens of meters to several tens of kilometers, including in difficult environments, the optical fibers being resistant to high temperatures and pressures. More particularly, an advantage is that a plurality of different measurement areas may be optically excited by means of a single optical fiber (fiber 22), the acoustic waves generated in the different measurement areas by photo-acoustic effect being measured by means of a single optical fiber (fiber 26).

Another advantage of such a device is that its behavior is not irreversibly modified when it is placed in contact with the desired substance(s).

Another advantage of the device of FIG. 2 is that the selection of the substance to be detected may be easily performed by adjusting the emission wavelength of light source 23.

FIG. 3 is a simplified cross-section view of an alternative embodiment of the device of FIG. 2. This variation differs from the example of FIG. 2 mainly by the structure of its distributed acoustic detector 25.

In the example of FIG. 3, optical fiber 26 of distributed acoustic detector 25 comprises a plurality of measurement regions 31, for example, regularly distributed along the entire length of the fiber. Each measurement region 31 comprises a Bragg mirror placed on the path of the light conveyed by fiber 26. In the presence of an acoustic vibration at the level of a measurement region 31, the properties of light transmission/reflection by the Bragg mirror are modified, which enables, by the analysis of the optical signals received by detector 28, to measure and locate the acoustic vibration. Thus, the acoustic detector 25 of the drawing carries out a "discrete" acoustic measurement, that is, in measurement areas defined along optical fiber 26, and not a "continuous" measurement as in the example of FIG. 2. The measurement regions 31 of acoustic detector 25 are preferably aligned with light extraction regions 24 of optical excitation device 21, as shown in FIG. 3. In practice (and conversely to what is shown in the drawing), the dimensions (in the longitudinal direction of the fibers) of light extraction regions 24 of optical excitation device 21 and of measurement regions 31 of acoustic detector 25 may be different. To obtain a good detection sensitivity, measurement regions 31 are preferably more extensive than light extraction regions 24.

FIG. 4 is a simplified cross-section view of another alternative embodiment of the device of FIG. 2.

In the example of FIG. 4, the optical fibers 22 of optical excitation device 21, and 26 of optical detection device 25, are confounded. The light source 23 of optical excitation device 21 and the light source 27 of acoustic detection device 25 are both coupled to the proximal end of optical fiber 22-26, as well as the optical detector 28 of acoustic detection device 25. As an example, the emission wavelength of light source 23 is different from the emission wavelength of light source 27, and the light extraction regions 24 of optical fiber 22-26 are sized to deviate to the outside of the fiber part of the light emitted by light source 23, but transmit with no substantial modification the light emitted by light source 27.

The alternative embodiment of FIG. 4 may be adapted to the case where acoustic detector 25 is of the type described in relation with FIG. 3, that is, comprising a plurality of discrete measurement regions 31 distributed along the optical fiber. In this case, each measurement region 31 may be arranged in the vicinity of a light extraction region 24. The measurement regions 31 of acoustic detection device 25 are for example sized to transmit with no substantial modification the light emitted by light source 23 of optical excitation device 25.

FIG. 5 is a partial simplified perspective view of an example of layout of optical fibers 22 and 26 of a distributed substance detection device of the above-described type. More particularly, the example shown in FIG. 5 corresponds to a device of the type described in relation with FIGS. 2 and 3, that is, comprising two different optical fibers 22 and 26 to respectively implement the optical excitation function of the monitored medium and the acoustic detection function. The layout of FIG. 5 may however easily be adapted to a device of the type described in relation with FIG. 4, where optical fibers 22 and 26 are confounded.

In the example of FIG. 5, optical fibers 22 and 26 are arranged in a same sheath or support 51 determining the relative positioning of fiber 22 relative to fiber 26. Sheath 51 further comprises a tubular cavity 53 extending along its entire length, parallel to optical fibers 22 and 26, having a positioning which is also fixed with respect to optical fibers 22 and 26. Cavity 53 is positioned to be illuminated by the light emitted from extraction regions 24 of optical fiber 22. In the shown example, optical fibers 22, 26 and cavity 53 are all three in contact all along their periphery with the material of sheath 51. In this example, the material of sheath 51 is a material transparent for the wavelength emitted by light source 23. Cavity 53 is for example arranged between fibers 22 and 26. In this example, sheath 51 comprises a plurality of openings 55, coupling cavity 53 to the outside environment. Openings 55 are for example regularly distributed all along the length of cavity 53. The inner wall of cavity 53 may be covered (except opposite light extraction regions 24 of optical fiber 22) with a layer which is reflective for the light exciting light source 23, to increase the absorption of light by the substance to be detected and thus increase the intensity of the generated acoustic wave.

When sheath 51 is installed in the medium to be monitored, the fluids (liquids and/or gas) of the outer medium penetrate into cavity 53 via openings 55 and fill cavity 53. The possible presence of the searched substance(s) in cavity 53 is then detected by photo-acoustic analysis according to the above-described operation.

An advantage of the layout of FIG. 5 is that the analyzed fluids are confined in cavity 53, which eases the implementation of the photo-acoustic analysis.

Figure 6:
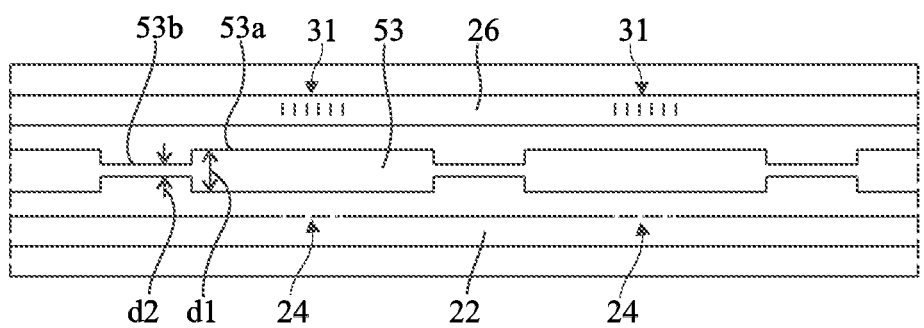
FIG. 6 is a partial simplified longitudinal cross-section view illustrating an alternative embodiment of the device of FIG. 5.

As a variation, and as illustrated in the longitudinal cross-section view of FIG. 6, to further improve the confinement of the fluid analyzed in cavity 53, the latter may comprise, in the longitudinal direction of the device, a succession of alternated areas 53a and 53b, areas 53a having a first width or a first diameter d1, and areas 53b being nip or throat areas having a width or diameter d2 smaller than d1 separating areas 53a two by two. Each area 53a of diameter d1 forms a fluid analysis chamber and is arranged opposite one or a plurality of light extraction regions 24 of optical excitation device 21. In the case where acoustic detector 25 is a detector with discrete measurement areas of the type described in relation with FIG. 3, each area 53a is further arranged opposite one or a plurality of measurement regions 31 of acoustic detector 25. Each analysis area 53a is for example directly coupled to the outer environment by openings 55 (not shown in FIG. 6) formed in sheath 51. Diameter d2 of throat areas 53b may possibly be zero, in which case cavity 53 is discontinuous.

As a variation, optical fiber 22 of the optical excitation device may be directly placed in cavity 53, in which case the material of sheath 51 may be opaque to the emission wavelength of light source 23.

Specific embodiments have been described. Various alterations and modifications will occur to those skilled in the art. In particular, the described embodiments are not limited to the examples of layout of optical fibers 22 and 26 described in relation with FIGS. 5 and 6.

Further, the described embodiments are not limited to the above-mentioned example of application to the detection of corrosive substances in oil drilling plants. More generally, the described embodiments may be adapted to any application where the presence of one or a plurality of specific substances, liquid or gaseous, in an extensive area, is desired to be detected.

What is claimed is:

1. A distributed substance detection device, comprising:
    a distributed optical excitation source comprising:
      a first optical fiber provided with a plurality of extraction regions regularly distributed along a length of the first optical fiber, each extraction region being configured for extracting from the first optical fiber part of the light conveyed by the fiber;
      a first light source configured for injecting into the first optical fiber a first light signal at an absorption wavelength of the substance to be detected; and
      a control circuit configured for modulating the first light signal in intensity at an acoustic frequency; and
    a distributed acoustic detector comprising:
      a second optical fiber;
      a second light source configured for injecting a second light signal into the second optical fiber; and
      an optical detector configured for measuring a backscattered light signal in the second optical fiber to detect and locate an acoustic vibration at the modulation frequency of the first light signal.

2. The device of claim 1, wherein the first and second optical fibers are intended to be placed in an area where the presence of said substance is desired to be detected.

3. The device of claim 1, wherein the first light source has an adjustable wavelength.

4. The device of claim 1, wherein the second optical fiber comprises a plurality of measurement regions each comprising a Bragg mirror placed on the path of the light conveyed by the second optical fiber.

5. The device of claim 1, wherein the first and second optical fibers are confounded.

6. The device of claim 1, further comprising a support having the first and second optical fibers arranged therein, the support defining a tubular cavity extending along substantially the entire length of the first and second optical fibers, said cavity being configured for confining a sample of a fluid where the possible presence of said substance is desired to be detected.

7. The device of claim 6, wherein said cavity is coupled to an outer environment by a plurality of openings formed in the support.

8. The device of claim 6, wherein the first optical fiber is located in said cavity.

9. The device of claim 6, wherein said cavity comprises a plurality of pinching or narrowing areas distributed all along its length.

10. The device of any of claim 1, wherein said substance to be detected is carbon dioxide or hydrogen sulfide.

11. The device of any of claim 1, wherein the first optical fiber comprises a core made of a transparent material having a first refraction index and a sheath made of a transparent material having a second refraction index, each extraction region corresponding to a portion of the first fiber comprising microstructures formed on the sheath of the fiber, configured for causing the extraction, to the outside of the first fiber, of part of the light conveyed by the fiber.

12. The device of claim 11, wherein the microstructures are disordered microstructures configured for diffusing in all directions part of the light conveyed by the first fiber.

13. The device of claim 11, wherein the microstructures are ordered microstructures defining a diffraction grating configured for deviating according to a determined angle part of the light conveyed by the first fiber.

14. The device of claim 1, wherein the extraction regions are sized so that, for a given emission power of the first light source, the light flow emitted outside of the first fiber at the level of each of the extraction regions has substantially the same intensity.

* * * * *